United States Patent
VanBlon et al.

(10) Patent No.: US 10,972,814 B2
(45) Date of Patent: Apr. 6, 2021

(54) CONTEXT-BASED SENSOR DATA RECORDING

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE, LTD., New Tech Park (SG)

( * ) Notice: Subject to any disclaimer, the term of this patent is extended or adjusted under 35 U.S.C. 154(b) by 0 days.

(21) Appl. No.: 15/937,054

(22) Filed: Mar. 27, 2018

(65) Prior Publication Data

US 2019/0306591 A1    Oct. 3, 2019

(51) Int. Cl.
*H04Q 9/00* (2006.01)

(52) U.S. Cl.
CPC ..................... *H04Q 9/00* (2013.01)

(58) Field of Classification Search
CPC .... H04Q 9/00; G06K 9/00342; A61B 5/1118; A61B 5/002
See application file for complete search history.

(56) References Cited

U.S. PATENT DOCUMENTS

| 2014/0371887 | A1* | 12/2014 | Hoffman | G06K 9/00342 700/91 |
| 2017/0180500 | A1* | 6/2017 | Wong | H04L 67/34 |
| 2018/0174691 | A1* | 6/2018 | Williams | G16H 80/00 |
| 2018/0290020 | A1* | 10/2018 | Vissa | H04L 67/22 |
| 2019/0164156 | A1* | 5/2019 | Lindemann | H04L 9/0825 |

* cited by examiner

*Primary Examiner* — Amine Benlagsir
(74) *Attorney, Agent, or Firm* — Kunzler Bean & Adamson (57) ABSTRACT

Apparatuses, methods, systems, and program products are disclosed for context-based sensor data recording. A method includes detecting, by a processor, a current context of an information handling device based on information sensed using one or more sensors of the information handling device. The method includes determining that the current context comprises a context that has been designated as a context of interest to a user. The method includes recording the information that is sensed using the one or more sensors in a storage volume in response to determining that the current context comprises a context of interest to the user.

20 Claims, 5 Drawing Sheets

CONTEXT-BASED SENSOR DATA RECORDING

FIELD

The subject matter disclosed herein relates to recording sensor data and more particularly relates to recording sensor data based on a particular context.

BACKGROUND

Internet of things devices such as smart televisions, smart speakers, smart appliances, and/or the like typically have various sensors that are enabled to collect data from a user, from the environment where the device is location, etc. However, at least some of the recorded sensor data may not be of interest to the user, and may merely be taking up storage space that may otherwise be used for more valuable data.

BRIEF SUMMARY

An apparatus for context-based sensor data recording is disclosed. The apparatus, in one embodiment, includes an information handling device that includes one or more sensors, a processor, and a memory that stores code executable by the processor. In one embodiment, the memory stores code executable by the processor to detect a current context of the information handling device based on information sensed using the one or more sensors. In a further embodiment, the memory stores code executable by the processor to determine that the current context comprises a context that has been designated as a context of interest to a user. In certain embodiments, the memory stores code executable by the processor to record the information that is sensed using the one or more sensors in a storage volume in response to determining that the current context comprises a context of interest to the user.

A method for context-based sensor data recording includes detecting, by a processor, a current context of an information handling device based on information sensed using one or more sensors of the information handling device. The method, in some embodiments, includes determining that the current context comprises a context that has been designated as a context of interest to a user. The method, in various embodiments, includes recording the information that is sensed using the one or more sensors in a storage volume in response to determining that the current context comprises a context of interest to the user.

A program product for context-based sensor data recording, in one embodiment, includes a computer readable storage medium that stores code executable by a processor. In some embodiments, the executable code includes code to perform detecting a current context of an information handling device based on information sensed using one or more sensors of the information handling device. The executable code, in certain embodiments, includes code to perform determining that the current context comprises a context that has been designated as a context of interest to a user. The executable code, in certain embodiments, includes code to perform recording the information that is sensed using the one or more sensors in a storage volume in response to determining that the current context comprises a context of interest to the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for context-based sensor data recording is disclosed. The apparatus, in one embodiment, includes an information handling device that includes one or more sensors, a processor, and a memory that stores code executable by the processor. In one embodiment, the memory stores code executable by the processor to detect a current context of the information handling device based on information sensed using the one or more sensors. In a further embodiment, the memory stores code executable by the processor to determine that the current context comprises a context that has been designated as a context of interest to a user. In certain embodiments, the memory stores code executable by the processor to record the information that is sensed using the one or more sensors in a storage volume in response to determining that the current context comprises a context of interest to the user.

In one embodiment, the current context is determined based on a proximity of the information handling device to one or more other devices as determined from the information sensed using the one or more sensors, and the current context is determined to be a context of interest to the user in response to the one or more other devices comprising a device that is previously designated as a known device.

In some embodiments, the current context is determined based on detecting one or more other people within a proximity of the information handling device as determined from the information sensed using the one or more sensors, and the current context is determined to be a context of interest to the user in response to the one or more other people comprising a person who is previously designated as a known person.

In further embodiments, the current context is determined based on detecting a location of the information handling device as determined from the information sensed using the one or more sensors, and the current context is determined to be a context of interest to the user in response to the location comprising a predefined location of interest.

In various embodiments, the current context is determined based on detecting an activity that the user is participating in as determined from the information sensed using the one or more sensors, and the current context is determined to be a context of interest to the user in response to the activity comprising a predefined activity of interest to the user.

In one embodiment, the current context is determined based on a calendar event that is associated with the user and stored in the information handling device, and the current context is determined to be a context of interest to the user in response to the calendar event comprising a predefined event that is of interest to the user.

In certain embodiments, the current context is determined based on detecting a person speaking from the information sensed using the one or more sensors, and the current context is determined to be a context of interest to the user in response to the person who is speaking comprising a predefined person of interest to the user.

In one embodiment, the current context is determined based on detecting a conversation between a plurality of users from the information sensed using the one or more sensors, and the current context is determined to be a context of interest to the user in response to a topic of the conversation comprising a predefined topic of interest to the user.

In various embodiments, the code is further executable by the processor to activate one or more other sensors of the information handling device for sensing additional context information in response to determining that the current context is a context of interest to the user. In some embodiments, the code is further executable by the processor to initially record all of the information that is sensed using the one or more sensors for a predefined period of time.

In one embodiment, the code is further executable by the processor to track various characteristics of the recorded information that the user consumes, over time, to determine one of more contexts of interest for the user. In certain embodiments, the code is further executable by the processor to degrade recorded information that the user does not consume for a period of time.

In some embodiments, the code is further executable by the processor to prompt a user to confirm one of recording and ignoring sensed information that is of a particular type. In one embodiment, the sensed information is selected from the group consisting of audio data, video data, accelerometer data, location data, gyroscope data, network identification data, and biometric data.

A method for context-based sensor data recording includes detecting, by a processor, a current context of an information handling device based on information sensed using one or more sensors of the information handling device. The method, in some embodiments, includes determining that the current context comprises a context that has been designated as a context of interest to a user. The method, in various embodiments, includes recording the information that is sensed using the one or more sensors in a storage volume in response to determining that the current context comprises a context of interest to the user.

In one embodiment of the method, the current context is determined based on detecting a location of the information handling device as determined from the information sensed using the one or more sensors, and the current context is determined to be a context of interest to the user in response to the location comprising a predefined location of interest.

In some embodiments of the method, the current context is determined based on detecting an activity that the user is participating in as determined from the information sensed using the one or more sensors, and the current context is determined to be a context of interest to the user in response to the activity comprising a predefined activity of interest to the user.

In various embodiments of the method, the current context is determined based on detecting a person speaking from the information sensed using the one or more sensors, and the current context is determined to be a context of interest to the user in response to the person who is speaking comprising a predefined person of interest to the user.

In one embodiment, the method includes activating one or more other sensors of the information handling device for sensing additional context information in response to determining that the current context is a context of interest to the user.

A program product for context-based sensor data recording, in one embodiment, includes a computer readable storage medium that stores code executable by a processor. In some embodiments, the executable code includes code to perform detecting a current context of an information handling device based on information sensed using one or more sensors of the information handling device. The executable code, in certain embodiments, includes code to perform determining that the current context comprises a context that has been designated as a context of interest to a user. The executable code, in certain embodiments, includes code to perform recording the information that is sensed using the one or more sensors in a storage volume in response to determining that the current context comprises a context of interest to the user.

Figure 1:
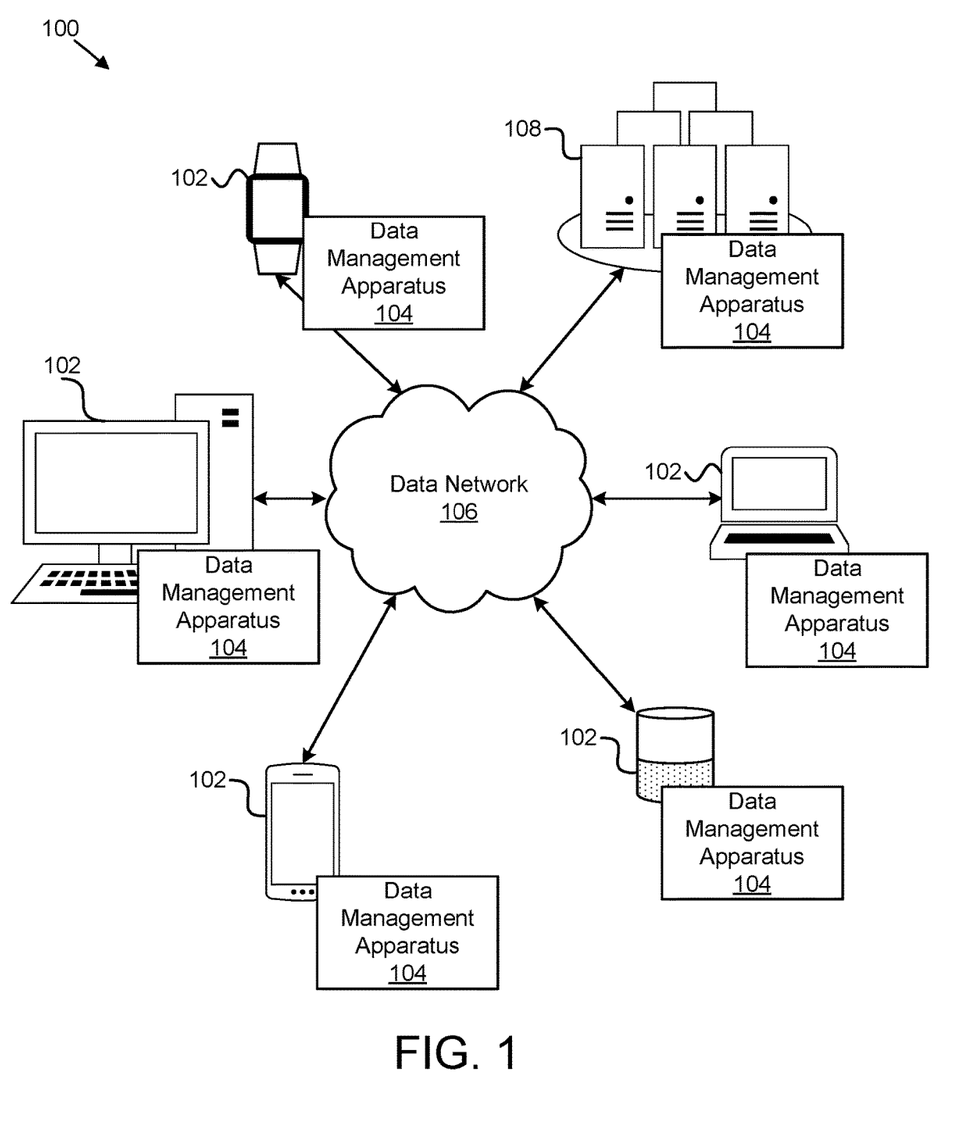
FIG. 1 is a schematic block diagram illustrating one embodiment of a system for context-based sensor data recording.

FIG. 1 is a schematic block diagram illustrating one embodiment of a system 100 for context-based sensor data recording. In one embodiment, the system 100 includes one or more information handling devices 102, one or more data management apparatuses 104, one or more data networks 106, and one or more servers 108. In certain embodiments, even though a specific number of information handling devices 102, data management apparatuses 104, data networks 106, and servers 108 are depicted in FIG. 1, one of skill in the art will recognize, in light of this disclosure, that any number of information handling devices 102, data management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for performing capturing context or environmental data using one or more sensors.

In certain embodiments, the information handling devices 102 comprise "Internet of Things" ("IoT") devices. As used herein, the IoT comprise a network of physical devices, e.g., vehicles, home appliances, home electronics, and/or other items embedded with electronics, software, sensors, actuators, and connectivity which enables these objects to connect and exchange data. Some of the data that may be exchanged may include data that the sensors collect such as voice and other audio data, video data, accelerometer data, location data, gyroscope data, network identification data, biometric data, and/or the like. Accordingly, some of the sensors may include proximity sensors, location sensors, infrared sensors, microphones, cameras, video cameras, accelerometers, gyroscopes, and/or the like.

In one embodiment, the data management apparatus 104 is configured to record data detected using various sensors of an IoT device based on whether the context under which the sensor data was collected is a context that a user of the data would be interested in. In one embodiment, the data management apparatus 104 detects a current context of the information handling device based on information sensed using the one or more sensors, determines that the current context comprises a context that has been designated as a context of interest to a user, and records the information that is sensed using the one or more sensors in a storage volume in response to determining that the current context comprises a context of interest to the user. The data management apparatus 104, including its various sub-modules, may be located on one or more information handling devices 102 in the system 100, one or more servers 108, one or more network devices, and/or the like. The data management apparatus 104 is described in more detail below with reference to FIGS. 2 and 3.

In one embodiment, the data management apparatus 104 improves upon conventional sensor data recording systems because the data management apparatus 104 is configured to first determine whether the current context in which the sensors collect data is a context that is of interest to the user, and if not, then the sensor data is not stored so that storage space, processing time, and power usage is not wasted on data that would not be of value to the user.

For example, a smart speaker such as an Amazon Echo® may detect people speaking near it, and may identify the people speaking as family members. The data management apparatus 104 may determine who is speaking, and may determine that a user may be interested in revisiting the conversation at a later time. Therefore, the context is of interest to the user, and the data management apparatus 104 records the conversation, e.g., the audio, video, or transcription of the conversation such that it is accessible to the user at a later time.

In various embodiments, the data management apparatus 104 may be embodied as a hardware appliance that can be installed or deployed on an information handling device 102, on a server 108, or elsewhere on the data network 106. In certain embodiments, the data management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the data management apparatus 104 may include a power interface, a wired and/or wireless network interface, a graphical interface that attaches to a display, and/or a semiconductor integrated circuit device as described below, configured to perform the functions described herein with regard to the data management apparatus 104.

The data management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the data management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the data management apparatus 104.

The semiconductor integrated circuit device or other hardware appliance of the data management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the data management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as sensor data, context data, user-profile data, device-specific data, and/or the like.

Figure 2:
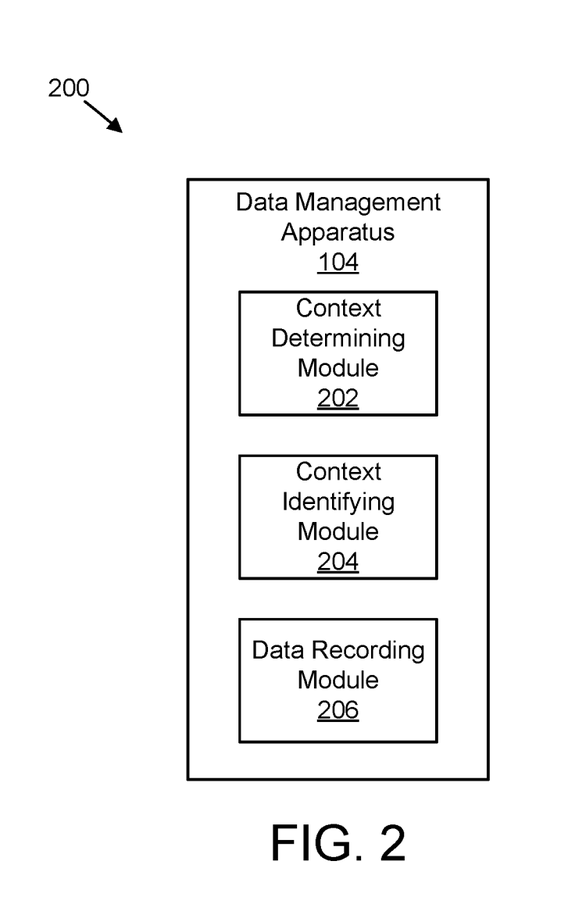
FIG. 2 is a schematic block diagram illustrating one embodiment of an apparatus for context-based sensor data recording.

FIG. 2 is a schematic block diagram illustrating one embodiment of an apparatus 200 for context-based sensor data recording. In one embodiment, the apparatus 200 includes an embodiment of a data management apparatus 104. The data management apparatus 104, in some embodiments, includes one or more of a context determining module 202, a context identifying module 204, and a data recording module 206, which are described in more detail below.

In one embodiment, the context determining module 202 is configured to detect a current context of an information handling device 102 based on information, data, or the like that is sensed using one or more sensors of the information handling device 102. As used herein, the current context of an information handling device 102 describes the environment that the information handling device 102 is currently in. For example, the current context may include a current day/time, people or devices within a proximity of the information handling device 102, a current activity (e.g., an activity that a user is participating in, an event within a proximity of the information handling device, and/or the like), a type of sound/noise, a topic of a conversation, a particular person who is speaking, and/or the like.

In one embodiment, the context determining module 202 determines the current context based on a proximity of the information handling device 102 to one or more other devices as determined from the information sensed using the one or more sensors. For instance, based on sensor information received from one or more proximity sensors, the context determining module 202 may detect other devices around the information handling device 102, and may gather identifying information from the other devices such as a device identifier, a media access control ("MAC") address, an internet protocol ("IP") address or other network identifier (e.g., a Bluetooth® identifier, a near field communication ("NFC") identifier, an infrared identifier, a Wi-Fi signal identifier, etc.), and/or the like.

In one embodiment, the context determining module 202 determines the current context based on detecting one or more other people within a proximity of the information handling device 102 as determined from the information sensed using the one or more sensors. For instance, the context determining module 202 may determine a person who is associated with a particular detected device (as explained above), may identify a person by the person's voice based on audio data that a microphone collects, may identify a person by the person's image based on video or image data that a camera collects (e.g., by using facial recognition or other image processing methods), and/or the like.

In one embodiment, the context determining module 202 determines the current context based on detecting a location of the information handling device 102 as determined from the information sensed using the one or more sensors. For example, the context determining module 202 may determine that the information handling device 102 is at a user's home, at a user's office, at a vacation location, at a friend's home, moving in a car, at a shopping location, and/or the like.

In one embodiment, the context determining module 202 determines the current context based on detecting an activity that the user is participating in as determined from the information sensed using the one or more sensors. The activity, for instance, may include a physical activity, an event that a user is attending, a meeting, a party, a conference, driving, exercising, eating a meal, and/or the like. In such an embodiment, the context determining module 202 may use location data collected using location sensors, calendar data from the information handling device 102, data identifying other users/device within a proximity of the information handling device 102, biometric data (e.g., heart rate, blood pressure, oxygen levels, etc.) collected using various biometric sensors, ambient noise data, and/or the like to determine the activity/event that the user is participating in.

In one embodiment, the context determining module 202 determines the current context based on a calendar event that is associated with the user and stored in the information handling device 102. For instance, the context determining module 202 may use calendar data as an indicator of an activity or event that a user may be attending such as, for example, a meeting, a concert, a wedding, a funeral, a family gathering, a graduation, a class or lecture, a conference, and/or the like. Additional sensor data may be used to confirm that the user is at the activity/event that the calendar indicates such as location data, audio data, video data, and/or the like.

In one embodiment, the context determining module 202 determines the current context based on detecting a person speaking from the information sensed using the one or more sensors. For instance, the context determining module 202 may use audio data captured using a microphone, video camera, and/or the like to determine that a person who is within a proximity of the information handling device 102 is speaking.

In one embodiment, the context determining module 202 determines the current context based on detecting a conversation between a plurality of users from the information sensed using the one or more sensors. In certain embodiments, for instance, the context determining module 202 may process voice data captured using a microphone, video camera, and/or the like using natural language processing and/or other sound processing methods to analyze the voice data to determine a topic of a conversation, one or more keywords of a conversation, and/or the like.

The context identifying module 204, in one embodiment, is configured to determine that the current context comprises a context that has been designated as a context of interest to a user. A context that is of interest to the user, as used herein, may include a context that the user may be interested in revisiting, reviewing, and/or the like at a later time. Accordingly, if the context identifying module 204 determines, based on the current context information that the context determination module 202 detects, that the user may be interested in the current environment that the information handling device 102 is in, which may include conversations, videos, people who are involved, and/or the like, then the sensor information may be recorded for future reference, as described below.

In one embodiment, the context identifying module 204 activates one or more other sensors of the information handling device 102 for sensing additional context information in response to determining that the current context is a context of interest to the user. For instance, if the context determining module 202 detects a person's voice, and the context identifying module 204 determines that the user's voice is for the user's wife and is therefore likely of interest to the user, the context identifying module 204 may activate the device's camera, video camera, location sensors, and/or any other sensors for collecting additional context data for the user.

Figure 3:
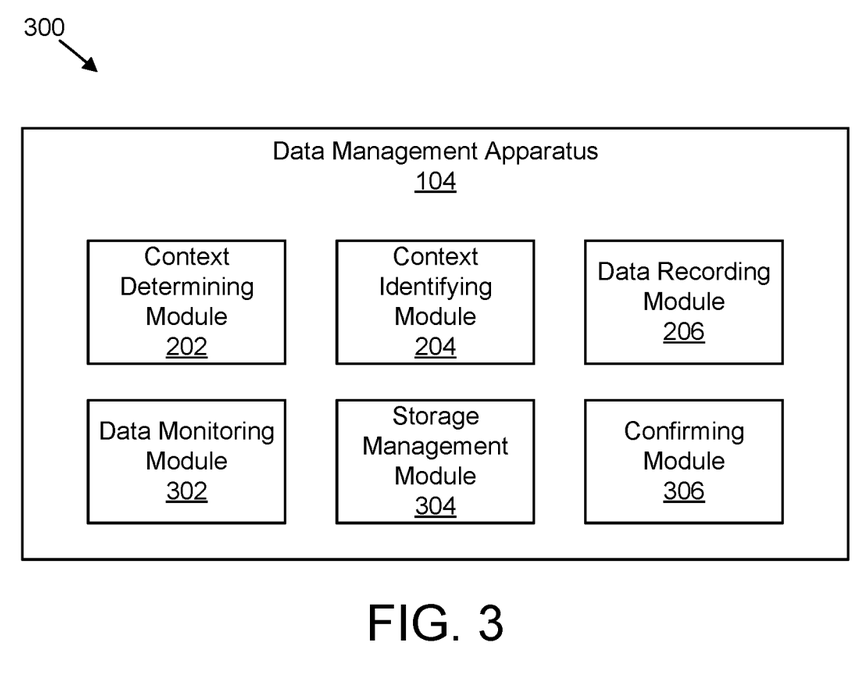
FIG. 3 is a schematic block diagram illustrating one embodiment of another apparatus for context-based sensor data recording.

The context identifying module 204, in one embodiment, determines that a context is of interest to the user by monitoring the user's historical use of previously collected context data, as described in more detail below with reference to the data monitoring module 302. For instance, if the user often accesses images of his family members, then the context identifying module 204 may determine that if the current context involves people who are in the user's family, then the current context is likely of interest to the user.

In one embodiment, the context identifying module 204 determines that the current context is a context of interest to the user in response to determining that one or more other devices that the context determining module 202 detects comprises a device that is previously designated as a known device. For example, the context identifying module 204 may determine that a device that was detected to be within a proximity of the information handling device 102 has a MAC address that was previously registered or otherwise associated with the user's spouse, which is likely of interest to the user. Similarly, other devices may previously registered or designated as devices of interest including other family members' devices, friends' devices, co-workers' and other business associates' devices, and/or the like.

In one embodiment, the context identifying module 204 determines that the current context is a context of interest to the user in response to one or more other people that the context determining module 202 detects comprising a person who is previously designated as a known person. For instance, the context determining module 202 may detect that a person who is speaking is the user's boss, who may have previously been identified, designated, and/or the like as a person of interest to the user. Other people may include the user's family members, friends, co-workers, and/or anybody who the user has designated as a known person.

In one embodiment, the context identifying module 204 determines that the current context is a context of interest to the user in response to the location of the information handling device 102 comprising a predefined location of interest. For example, the user's home (or a particular area of the user's home), the user's workplace, the user's car, and/or the like may be predefined locations of interest to the user. As used herein, predefined locations of interest may be locations that the user has previously specified as a location of interest, locations that the context identifying module 204 has determined to be a location of interest based on the user's previous activities at the location, and/or the like.

In one embodiment, the context identifying module 204 determines that the current context is a context of interest to the user in response to an activity or event that the user is participating in comprising a predefined activity/event of interest to the user. For example, the context identifying module 204 may determine that the user's participation at a game, competition, meeting, conference, family event, and/or the like is of interest to the user based on the user's previous participation in similar activities/events, based on the user explicitly designating the activity/event as an activity/event of interest, and/or the like.

In one embodiment, the context identifying module 204 determines that the current context is a context of interest to the user in response to a calendar event comprising a predefined event that is of interest to the user. For example, the context identifying module 204 may determine that the user frequently accesses data from particular meetings that are attended by certain people, and therefore a similarly scheduled meeting with the same invited participants is likely of interest to the user. Other calendar events may include conferences, vacations, family gatherings, lectures, classes, and/or the like.

In one embodiment, the context identifying module 204 determines that the current context is a context of interest to the user in response to a person who is speaking within a sensing proximity of the information handling device 102 comprising a predefined person of interest to the user. For example, the context identifying module 204 may determine that an audio stream sensed using the microphone is a professor in a lecture hall, and may determine that the user typically listens to recorded lectures of the professor's, and therefore the current lecture is likely of interest to the user. Similar contexts may include family members, co-workers, employers, friends, people on television, audiobook narrators, and/or the like.

In one embodiment, the context identifying module 204 determines that the current context is a context of interest to the user in response a topic of a conversation between multiple different people comprising a predefined topic of interest to the user. The topic of interest may be related to the user's work, sports, family, current events, hobbies/interests, food, travel, and/or the like. For instance, if the user works in real estate and a topic of the ongoing conversation is related to the current real-estate market, the context identifying module 204 may determine that the current conversation may be of interest to the user.

The data recording module 206, in one embodiment, is configured to record the information that is sensed using the one or more sensors in a storage volume in response to determining that the current context comprises a context of interest to the user. For example, if the context identifying module 204 determines that a current conversation among the user and his friends is of interest to the user, the recording module 204 may store the audio data captured by a microphone on a storage volume of the user's smart phone. Other storage locations may include a remote data store such as a cloud or other remote network device.

In this manner, instead of simply recording or storing data for everything that a device senses using various sensors, the data management apparatus 104 can filter-out data that the user is likely not to access or use and store data that is of value to the user, which saves storage space, processing time, and energy usage of the devices in the system.

FIG. 3 is a schematic block diagram illustrating one embodiment of an apparatus 300 for context-based sensor data recording. In one embodiment, the apparatus 300 includes an embodiment of a data management apparatus 104. The data management apparatus 104, in some embodiments, includes one or more of a context determining module 202, a context identifying module 204, and a data recording module 206, which may be substantially similar to the context determining module 202, the context identifying module 204, and the data recording module 206 described above with reference to FIG. 2. In further embodiments, the data management apparatus 104 includes one or more of a data monitoring module 302, a storage management module 304, and/or a confirming module 306, which are described in more detail below.

The data monitoring module 302, in one embodiment, is configured to track various characteristics of the recorded sensor information that the user consumes, over time, to determine one of more contexts of interest for the user. In some embodiments, the various characteristics of the data that the data monitoring module 302 tracks includes the types of data that the user accesses, how often the user accesses the data, people associated with the data (e.g., who is speaking, who is present in a video, etc.), devices associated with the data, dates associated with the data, events/activities associated with the data, and/or the like.

Based on the user's access or use of the data, the data monitoring module 302 may determine which data is of value to the user. The data monitoring module 302 may tag data when it is accessed, may update a count or mapping of access to particular data or files, and/or the like in order to track how often the user accesses or uses certain data. Over time, the data monitoring module 302 can learn which data will likely be of interest to the user, based on a device's context, and can recommend, forecast, predict, and/or the like whether a current context is likely a context of interest for the user or not, based on a sample of the sensor information detected with the various sensors of an information handling device 102.

In certain embodiments, the data recording module 206 initially records all, or substantially all, of the context information that is detected with the sensors. For example, when the system is first being used, the data recording module 206 may record substantially all context information that the sensors collect in order to generate a baseline data set. Over time, the data monitoring module 302 tracks the user's usage of the data to discriminate between context data that is of value to the user and context data that the user rarely, if ever, uses. For example, if the data monitoring module 302 determines that the user does not access, query, or use voice data associated with a particular co-worker, the data monitoring module 302 may recommend or instruct the context determining module 202 to ignore data that only includes voice data for that co-worker.

In one embodiment, the data monitoring module 302 determines different data collection rules for different contexts, e.g., different locations, different people, different devices, and/or the like, and/or any combination of the foregoing. For example, the data monitoring module 302 may determine that the user does not query data associated with his boss when he is at home and/or when the data is collected at the user's home, but he does query data associated with his boss when he is at work and/or when the data is collected at his work. Thus, the data monitoring module 302 may instruct the context determining module 202 to ignore capturing sensor data for the user's boss when the user is at home and/or when the user and the boss are together at the user's house, but to capture the sensor data for the boss when the user is at his work.

In one embodiment, the storage management module 304 is configured to manage storage of the recorded sensor information. For instance, if the data recording module 206 determines certain files, data structures, and/or other stored data are not of interest to the user because the user has not accessed the data for a period of time, the storage management module 304 may, over time, degrade the data (e.g., by applying a "lossy" compression algorithm on the data). In certain embodiments, the storage management module 304 may delete the data from the storage volume so that the storage space can be used for context data that is of more value to the user.

The confirming module 306, in one embodiment, is configured to prompt a user to confirm recording and/or ignoring sensed information that is of a particular type. For instance, continuing with the example above, the confirming module 306 may present a prompt to the user that asks the user to confirm whether data related to the particular coworker should be ignored, degraded, deleted, and/or the like or whether the data management module 104 should continue to collect data related to the co-worker.

Figure 4:
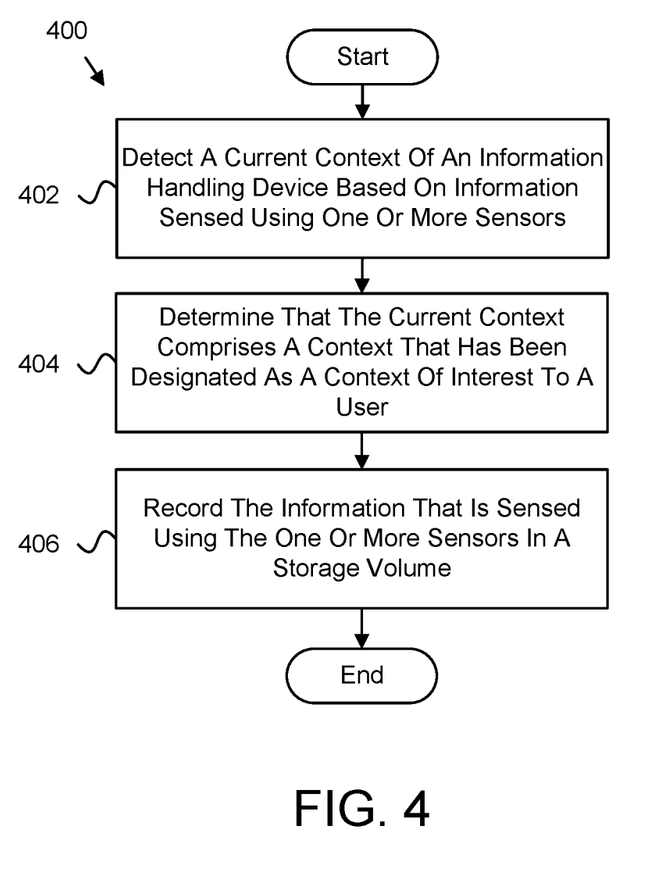
FIG. 4 is a schematic flow chart diagram illustrating one embodiment of a method for context-based sensor data recording.

FIG. 4 is a schematic flow chart diagram illustrating one embodiment of a method 400 for context-based sensor data recording. In one embodiment, the method 400 begins and the context determining module 202 detects 402 a current context of an information handling device 102 based on information sensed using one or more sensors of the information handling device 102. In certain embodiments, the context identifying module 204 determines 404 that the current context comprises a context that has been designated as a context of interest to a user. In further embodiments, the data recording module 206 records 406 the information that is sensed using the one or more sensors in a storage volume in response to determining that the current context comprises a context of interest to the user, and the method 400 ends.

Figure 5:
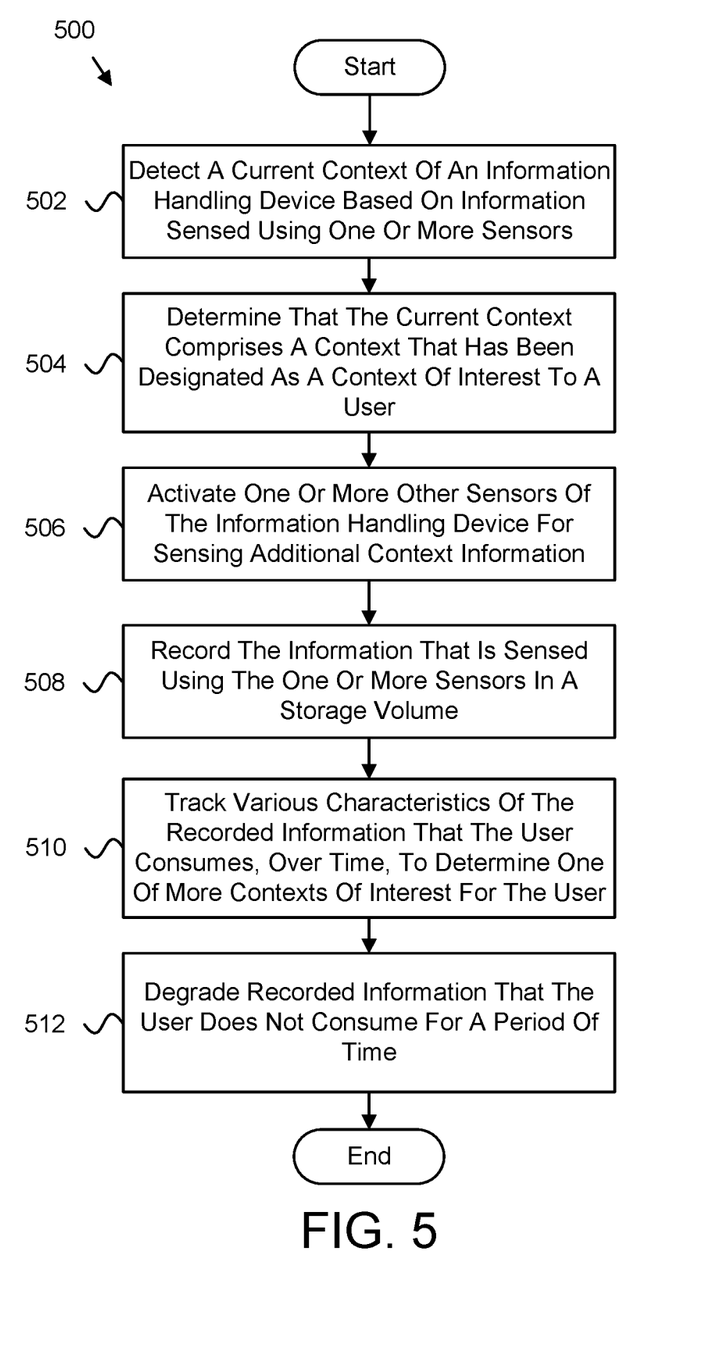
FIG. 5 is a schematic flow chart diagram illustrating one embodiment of another method for context-based sensor data recording.

FIG. 5 is a schematic flow chart diagram illustrating one embodiment of another method 500 for context-based sensor data recording. In one embodiment, the method 500 begins and the context determining module 202 detects 502 a current context of an information handling device 102 based on information sensed using one or more sensors of the information handling device 102. In certain embodiments, the context identifying module 204 determines 504 that the current context comprises a context that has been designated as a context of interest to a user.

In various embodiments, the context identifying module 204 activates 506 one or more other sensors of the information handling device 102 for sensing additional context information in response to determining that the current context is a context of interest to the user. In one embodiment, the data recording module 206 records 508 the information that is sensed using the one or more sensors in a storage volume in response to determining that the current context comprises a context of interest to the user.

In further embodiments, the data monitoring module 302 tracks 510 various characteristics of the recorded information that the user consumes, over time, to determine one of more contexts of interest for the user. In some embodiments, the storage management module 304 degrades 512 the recorded information that the user does not consume for a period of time, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
an information handling device comprising one or more sensors;
a processor of the information handling device; and
a memory that stores code executable by the processor to:
record, initially, all context data that is sensed using the one or more sensors for a predefined period of time;
track a usage of a user of a previously recorded context data that is previously captured using the one or more sensors;
detect a current context of the information handling device based on information sensed using the one or more sensors;
determine various characteristics of the previously recorded context data that are of value to the user based on the user's usage of the previously recorded context data;
determine context data recording rules for the current context based on plural characteristics of the context data, the context data recording rules comprising rules for recording the context data for contexts that are of interest to the user, the contexts of the interest comprising an environment that the information handling device is in that the user may be interested in reviewing at a later time;
determine that the current context comprises a context that matches a context data recording rule;
activate, in response to said determining that the current context matches the context data recording rule, one or more other sensors of the information handling device for sensing additional context information; and
record the information that is sensed using the one or more sensors and the activated one or more other sensors in a storage volume in response to said determining that the current context matches the context data recording rule.

2. The apparatus of claim 1, wherein:
the current context is determined based on a proximity of the information handling device to one or more other devices as determined from the information sensed using the one or more sensors; and
the current context is determined to be the contexts of the interest to the user in response to the one or more other devices comprising a device that is previously designated as a known device.

3. The apparatus of claim 1, wherein:
the current context is determined based on detecting one or more other people within a proximity of the information handling device as determined from the information sensed using the one or more sensors; and
the current context is determined to be the contexts of the interest to the user in response to the one or more other people comprising a person who is previously designated as a known person.

4. The apparatus of claim 1, wherein:
the current context is determined based on detecting a location of the information handling device as determined from the information sensed using the one or more sensors; and
the current context is determined to be the contexts of the interest to the user in response to the location comprising a predefined location of interest.

5. The apparatus of claim 1, wherein:
the current context is determined based on detecting an activity that the user is participating in as determined from the information sensed using the one or more sensors; and the current context is determined to be the contexts of the interest to the user in response to the activity comprising a predefined activity of interest to the user.

6. The apparatus of claim 1, wherein:
the current context is determined based on a calendar event that is associated with the user and stored in the information handling device; and
the current context is determined to be the contexts of the interest to the user in response to the calendar event comprising a predefined event that is of interest to the user.

7. The apparatus of claim 1, wherein:
the current context is determined based on detecting a person speaking from the information sensed using the one or more sensors; and
the current context is determined to be the contexts of the interest to the user in response to the person who is speaking comprising a predefined person of interest to the user.

8. The apparatus of claim 1, wherein:
the current context is determined based on detecting a conversation between a plurality of users from the information sensed using the one or more sensors; and
the current context is determined to be the contexts of the interest to the user in response to a topic of the conversation comprising a predefined topic of interest to the user.

9. The apparatus of claim 1, wherein the code is further executable by the processor to track characteristics of the recorded information that the user consumes, over time, to determine one of more contexts of interest for the user.

10. The apparatus of claim 9, wherein the code is further executable by the processor to degrade the recorded information that the user does not consume for a period of time.

11. The apparatus of claim 1, wherein the code is further executable by the processor to prompt the user to confirm one of recording and ignoring sensed information that is of a particular type.

12. The apparatus of claim 1, wherein the sensed information is selected from the group consisting of audio data, video data, accelerometer data, location data, gyroscope data, network identification data, and biometric data.

13. The apparatus of claim 1, wherein the plural characteristics of the context data that are tracked comprise types of data that the user accesses, how often the user accesses the data, people associated with the data, devices associated with the data, dates associated with the data, and events/activities associated with the data.

14. The apparatus of claim 1, wherein the code is further executable by the processor to mark data comprising characteristics that are of value to the user by one or more of tagging data when it is accessed and updating an access count for the data when it is accessed.

15. The apparatus of claim 1, wherein the code is further executable to, over time, learn which of the context data is of the interest to the user based on a sample of the context data that the one or more sensors capture.

16. A method comprising:
recording, initially, all context data that is sensed using one or more sensors for a predefined period of time:
tracking a usage of a user of a previously recorded context data that is previously captured using the one or more sensors;
detecting, by a processor, a current context of an information handling device based on information sensed using the one or more sensors of the information handling device;
determining various characteristics of the previously recorded context data that are of value to the user based on the user's usage of the previously recorded context data;
determining context data recording rules for the current context based on plural characteristics of the context data, the context data recording rules comprising rules for recording the context data for contexts that are of interest to the user, the contexts of the interest comprising an environment that the information handling device is in that the user may be interested in reviewing at a later time;
determining that the current context comprises a context that matches a context data recording rule;
activating, in response to said determining that the current context matches the context data recording rule, one or more other sensors of the information handling device for sensing additional context information; and
recording the information that is sensed using the one or more sensors and the activated one or more other sensors in a storage volume in response to said determining that the current context matches the context data recording rule.

17. The method of claim 16, wherein:
the current context is determined based on detecting a location of the information handling device as determined from the information sensed using the one or more sensors; and
the current context is determined to be the contexts of the interest to the user in response to the location comprising a predefined location of interest.

18. The method of claim 16, wherein:
the current context is determined based on detecting an activity that the user is participating in as determined from the information sensed using the one or more sensors; and
the current context is determined to be the contexts of the interest to the user in response to the activity comprising a predefined activity of interest to the user.

19. The method of claim 16, wherein:
the current context is determined based on detecting a person speaking from the information sensed using the one or more sensors; and
the current context is determined to be the contexts of the interest to the user in response to the person who is speaking comprising a predefined person of interest to the user.

20. A program product comprising a non-transitory computer readable storage medium that stores code executable by a processor, the executable code comprising code to perform:
recording, initially, all context data that is sensed using one or more sensors for a predefined period of time:
tracking a usage of a user of a previously recorded context data that is previously captured using the one or more sensors;
detecting, by a processor, a current context of an information handling device based on information sensed using the one or more sensors of the information handling device;
determining various characteristics of the previously recorded context data that are of value to the user based on the user's usage of the previously recorded context data;
determining context data recording rules for the current context based on plural characteristics of the context data, the context data recording rules comprising rules for recording the context data for contexts that are of interest to the user, the contexts of the interest comprising an environment that the information handling device is in that the user may be interested in reviewing at a later time;

determining that the current context comprises a context that matches a context data recording rule;

activating, in response to said determining that the current context matches the context data recording rule, one or more other sensors of the information handling device for sensing additional context information; and recording the information that is sensed using the one or more sensors and the activated one or more other sensors in a storage volume in response to said determining that the current context matches the context data recording rule.

\* \* \* \* \*